US010613830B2

(12) United States Patent
Fujita et al.

(10) Patent No.: US 10,613,830 B2
(45) Date of Patent: Apr. 7, 2020

(54) DATA PROCESSING DEVICE, DATA PROCESSING METHOD, AND STORAGE MEDIUM (71) Applicant: Yokogawa Electric Corporation, Musashino-shi, Tokyo (JP)

(72) Inventors: Sho Fujita, Tokyo (JP); Kimikazu Takahashi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 2 days.

(21) Appl. No.: 15/863,242

(22) Filed: Jan. 5, 2018

(65) Prior Publication Data
US 2018/0196639 A1 Jul. 12, 2018

(30) Foreign Application Priority Data

Jan. 11, 2017 (JP) ................. 2017-002895

(51) Int. Cl.
G06F 17/11 (2006.01)
G05B 23/02 (2006.01)
G06F 7/523 (2006.01)
G06F 17/12 (2006.01)

(52) U.S. Cl.
CPC ......... G06F 7/523 (2013.01); G05B 23/0232 (2013.01); G06F 17/11 (2013.01); G06F 17/12 (2013.01); G05B 2219/34477 (2013.01); G05B 2219/50065 (2013.01)

(58) Field of Classification Search
CPC ...... G06F 17/12; G06F 17/17; G05B 23/0232
See application file for complete search history.

(56) References Cited

U.S. PATENT DOCUMENTS 5,698,983 A * 12/1997 Arai .................. G01R 31/3828
324/427
2012/0235484 A1 9/2012 Yamada et al.
2013/0325158 A1 12/2013 Kobayashi et al.
2016/0140009 A1 5/2016 Watanabe et al.
2017/0115654 A1 4/2017 Odai et al.
(Continued)

FOREIGN PATENT DOCUMENTS

EP 1727009 A1 11/2006
EP 2669757 A2 12/2013
JP 50065777 A 6/1975
(Continued)

Primary Examiner — Chuong D Ngo
(74) Attorney, Agent, or Firm — Sughrue Mion, PLLC (57) ABSTRACT A data processing device according to one aspect of the present invention includes an extractor configured to extract time-series data indicating observed values at points in time in an analysis range from a first point in time to a second point in time, and a first calculator configured to calculate a gradient of a linear function indicating a trend of change in the observed values in the analysis range to minimize an objective function. The objective function indicates a sum of multiplication values at the points in time within the analysis range, the multiplication value is a numerical value obtained by multiplying a square of a difference between a function value of the linear function and the observed value by a weighting coefficient, and the weighting coefficient is a numerical value that increases as an elapsed time from the first point in time to each point in time increases.

18 Claims, 5 Drawing Sheets (56) References Cited

U.S. PATENT DOCUMENTS

2017/0343968 A1* 11/2017 Florentino ........... G05B 13/041

FOREIGN PATENT DOCUMENTS

| JP | 62174802 A | 7/1987 |
|---|---|---|
| JP | 10-81402 A | 3/1998 |
| JP | 2003-535417 A | 11/2003 |
| JP | 2004-38357 A | 2/2004 |
| JP | 2014-67276 A | 4/2014 |
| JP | 2014-167706 A | 9/2014 |
| JP | 5868784 B2 | 2/2016 |
| JP | 2016-95751 A | 5/2016 |
| WO | 01/93757 A1 | 12/2001 |
| WO | 2011093362 A1 | 8/2011 |
| WO | 2015193985 A1 | 12/2015 |

* cited by examiner

DATA PROCESSING DEVICE, DATA PROCESSING METHOD, AND STORAGE MEDIUM

BACKGROUND OF THE INVENTION

Field of the Invention

The present invention relates to a data processing device, a data processing method, and a program.

The present application claims priority based on Japanese patent application 2017-2895, filed on Jan. 11, 2017 and includes herein by reference the content thereof.

Description of Related Art

In the related art, time-series data, which fluctuates constantly with the passage of time, is displayed and used in interpretation of a trend of change in the displayed data, detection of an abnormality, and future prediction. Observed values at times constituting the time-series data generally include a component that fluctuates irregularly at short time intervals. By viewing the displayed time-series data, an observer can have an overview of irregular change and find a trend of change in observed values. In order to allow the observer to ascertain trends of change in the observed value, future observed values and the like may be calculated from causal relationships between various factors of fluctuation and hypotheses of dynamic characteristics.

For example, a process monitoring system described in Japanese Patent No. 5868784 determines a state of a plant on the basis of a trend of change in a state quantity on the basis of time-series data output from a field device configured to measure a state quantity in an industrial process and displays the state and the state quantity. The monitoring device described in Japanese Unexamined Patent Application. First Publication No. 2014-167706 outputs a trend graph in which time-series data of a physical quantity including a predicted value of a future physical quantity is graphed on the basis of a physical quantity measured by a sensor.

SUMMARY OF THE INVENTION

It is not always easy to quantify trends of change in observed values. For example, a moving average is used as a method of eliminating or reducing irregular change in observed values. The moving average is a method of calculating, as a moving average value, an average value of observed values within a predetermined analysis period, for example, from some point in time to the present. Because it is necessary to lengthen a processing period so as to increase a degree of smoothing, a phase of the calculated moving average value is then behind a currently observed value. If real-time performance is important in monitoring, there are some cases in which the moving average is not applicable. On the other hand, because an observer monitoring time-series data predicts a trend of change and a future value on the basis of his/her own experience and knowledge, interpretation of the time-series data depends on the observer's own ability. Thus, there are some cases in which the observer is not able to accurately determine a state of a monitoring object such as a plant. When various time-series data are to be monitored at the same time, there are some cases in which the burden for monitoring or operation thereof increases.

One aspect of the present invention provides a data processing device, a data processing method, and a storage medium capable of allowing an observer to easily ascertain a trend of change in time-series data.

A data processing device according to a first aspect of the present invention may include an extractor configured to extract time-series data indicating observed values at points in time in an analysis range from a first point in time to a second point in time, and a first calculator configured to calculate a gradient of a linear function indicating a trend of change in the observed values in the analysis range to minimize an objective function. The objective function may indicate a sum of multiplication values at the points in time within the analysis range, the multiplication value may be a numerical value obtained by multiplying a square of a difference between a function value of the linear function and the observed value by a weighting coefficient, and the weighting coefficient may be a numerical value that increases as an elapsed time from the first point in time to each point in time increases.

In the above-described data processing device, the weighting coefficient may be a numerical value that is proportional to the elapsed time.

In the above-described data processing device, the first calculator may be configured to calculate a moving average value at the first point in time on the basis of the observed value at each point in time and calculate the function value on the basis of the gradient and the moving average value.

The above-described data processing device may further include a display controller configured to generate graph data indicating the linear function and output the graph data to a display.

The above-described data processing device may further include a second calculator configured to calculate a deviation of an input value input from a control target and a target value of the input value as the observed values, and a third calculator configured to calculate an output value to be output to the control target on the basis of at least the gradient at a present point in time.

In the above-described data processing device, the second point in time may be a present point in time, and the first point in time may be a reference point in time which is a predetermined time earlier than the present point in time. The first calculator may be configured to calculate a centered moving average value having the reference point in time as a center time and calculate the function value on the basis of the gradient and the centered moving average value.

In the above-described data processing device, the first calculator may be configured to calculate a slice of the linear function under a condition that the function value at the reference point in time is equal to the centered moving average value.

In the above-described data processing device, the first calculator may be configured to calculate the function value on the basis of the gradient, the slice, and the centered moving average value.

In the above-described data processing device, the extractor may be configured to extract, as the time-series data, physical quantities indicating operation state of a plant facility.

In the above-described data processing device, the first calculator may be configured to output the calculated function value at each point in time to the display controller. The display controller may be configured to generate the graph data indicating a variation with time of the function value and the observed value at each point in time.

A data processing method according to a second aspect of the present invention may include extracting time-series data indicating observed values at points in time in an analysis range from a first point in time to a second point in time and calculating a gradient of a linear function indicating a trend of change in the observed values in the analysis range to minimize an objective function. The objective function may indicate a sum of multiplication values at the points in time within the analysis range, the multiplication value may be a numerical value obtained by multiplying a square of a difference between a function value of the linear function and the observed value by a weighting coefficient, and the weighting coefficient may be a numerical value that increases as an elapsed time from the first point in time to each point in time increases.

In the above-described data processing method, the weighting coefficient may be a numerical value that is proportional to the elapsed time.

The above-described data processing method further include calculating a moving average value at the first point in time on the basis of the observed value at each point in time and calculating the function value on the basis of the gradient and the moving average value.

The above-described data processing method further include generating graph data indicating the linear function and outputting the graph data to a display.

The above-described data processing method further include calculating a deviation of an input value input from a control target and a target value of the input value as the observed values and calculating an output value to be output to the control target on the basis of at least the gradient at a present point in time.

In the above-described data processing method, the second point in time may be a present point in time, and the first point in time may be a reference point in time which is a predetermined time earlier than the present point in time. The first data processing method may further include calculating a centered moving average value having the reference point in time as a center time and calculating the function value on the basis of the gradient and the centered moving average value.

The above-described data processing method further include calculating a slice of the linear function under a condition that the function value at the reference point in time is equal to the centered moving average value.

In the above-described data processing method, calculating the function value may include calculating the function value on the basis of the gradient, the slice, and the centered moving average value.

In the above-described data processing method, extracting the time-series data may include extracting, as the time-series data, physical quantities indicating operation state of a plant facility.

A non-transitory computer-readable storage medium according to a first aspect of the present invention may store a program, which when executed by a computer, causes the computer to: extract time-series data indicating observed values at points in time in an analysis range from a first point in time to a second point in time and calculate a gradient of a linear function indicating a trend of change in the observed values in the analysis range to minimize an objective function. The objective function may indicate a sum of multiplication values at the points in time within the analysis range. The multiplication value may be a numerical value obtained by multiplying a square of a difference between a function value of the linear function and the observed value by a weighting coefficient, and the weighting coefficient may be a numerical value that increases as an elapsed time from the first point in time to each point in time increases.

According to the one aspect of the present invention, an observer can easily ascertain a trend of change in time-series data. In addition to displaying a quantified gradient as described above, there is a method using a quantified gradient as a more stable substitute value for an amount of change in a deviation between a target value and an input value in automatic control. That is, stable control is implemented by replacing an unstable and practically unavailable amount of change in a deviation hitherto vulnerable to noise, other disturbances, and the like with a quantified gradient.

DETAILED DESCRIPTION OF THE INVENTION

Hereinafter, embodiments of a data processing device, a data processing method, and a storage medium according to the present invention will be described with reference to the drawings.
(Data Processing System)

A configuration example of the data processing system according to the present embodiment will be described.

Figure 1:
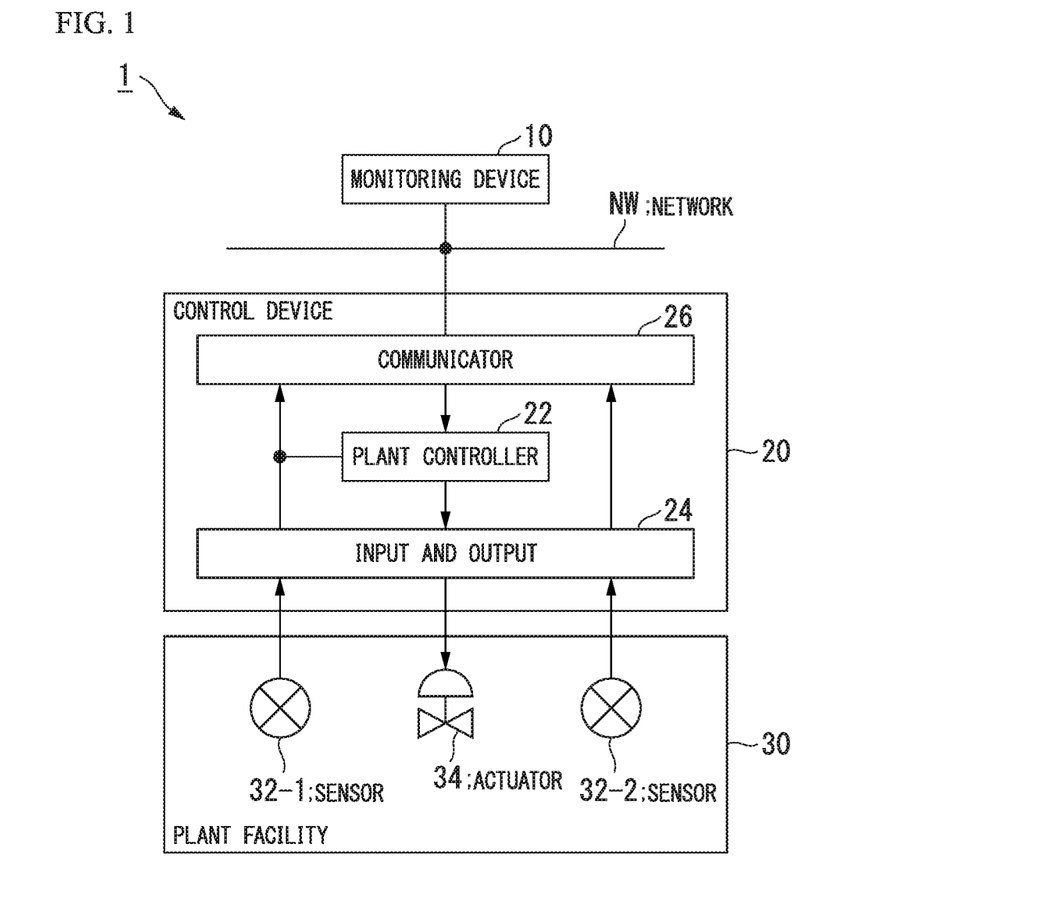
FIG. 1 is a block diagram showing a configuration example of a data processing system according to the present embodiment.

FIG. 1 is a block diagram showing a configuration example of the data processing system according to the present embodiment.

The data processing system 1 includes, for example, a monitoring device 10 and a control device 20. The monitoring device 10 and the control device 20 are embodiments of the data processing device of the present invention. In the example shown in FIG. 1, a controlled system to be controlled by the control device 20 is a plant facility 30. The monitoring device 10 and the control device 20 are connected via a network NW. Various types of data can be mutually transmitted and received between the monitoring device 10 and the control device 20 in a wireless or wired mode. The monitoring device 10 and the control device 20 may be configured as a single integrated device. Accordingly, the network NW does not necessarily become a component of the data processing system 1.

The monitoring device 10 sequentially receives observation data from the control device 20 via the network NW. The observation data is data indicating observed values at points in time. The monitoring device 10 generates a display graph indicating the observed values and/or function values obtained through an analysis process on observed values, and displays the generated display graph on a display (to be described below). The monitoring device 10 generates various types of instruction information on the basis of an operation signal according to an operation received by an operation input (to be described below). The instruction information includes target information for giving a control target value. The monitoring device 10 transmits the generated target information to the control device 20. The monitoring device 10 may be configured as, for example, a personal computer, a workstation, a business portable terminal device (tablet), a multifunctional portable phone, or the like.

The control device 20 is a control device configured to perform control so that an input value input from the controlled system to be controlled approaches a target value. In the example shown in FIG. 1, the controlled system is the plant facility 30. The control device 20 includes, for example, a plant controller 22, an input and output 24, and a communicator 26. For example, the control device 20 may be configured as a distributed control system (DCS), a factory automation (FA) programmable logic controller (PLC), or the like.

In the plant controller 22, input information input from the plant facility 30 is input at predetermined time intervals via the input and output 24. An input value indicated by this input information corresponds to an amount of control. The target information transmitted from the monitoring device 10 is input to the plant controller 22 via the communicator 26. The plant controller 22 sets a target value on the basis of the target information and sequentially calculates output values to be output to the plant facility 30 on the basis of a deviation between the target value and the output value. The calculated output value corresponds to an amount of operation. The plant controller 22 outputs output information indicating the calculated output value to the plant facility 30 via the input and output 24. The control device 20 transmits observation data indicating either one or both of an input value and a deviation sequentially obtained as observed values to the monitoring device 10 via the communicator 26. If the number of sensors 32 is two or more, an output value from a sensor 32, for example, the sensor 32-1, may be used for control to be executed by the plant controller 22, and an input value from another sensor 32, for example, a sensor 32-2, may not be used therefor. However, an input value unused for control may also be a monitoring object of the monitoring device 10. That is, the observation data indicating the input value may also be output to the monitoring device 10.

The input and output 24 inputs and outputs various types of data to/from the plant facility 30. The input and output 24 is, for example, an input/output interface.

The communicator 26 is connected to the network NW and transmits/receives various types of data to/from a device connected to the network NW, for example, the monitoring device 10, in a wireless or wired mode. The communicator 26 is, for example, a communication interface. The input and output 24 and the communicator 26 may be configured integrally or separately and independently. Communication between the sensor 32 and the actuator 34 of the plant facility 30 and the control device 20 may be performed via the network NW in a wireless or wired mode or the like.

The plant facility 30 is a facility whose operation state is controlled by the output information output from the control device 20. The plant facility 30 inputs input information indicating the operation state to the control device 20. The plant facility 30 includes, for example, the sensor 32 and the actuator 34.

The sensor 32 is a sensor for detecting the operation state of the plant facility 30. The sensor 32 is, for example, a temperature sensor configured to detect temperature, a pressure sensor configured to detect pressure, a flow meter configured to detect a fluid, an ammeter configured to detect a current, a voltmeter configured to detect a voltage, or the like. The sensor 32 detects a state that fluctuates according to an operation of the actuator 34. The sensors 32-1 and 32-2 sequentially input output information indicating the detected states to the control device 20. The sensors 32-1 and 32-2 may be sensors configured to detect different types of physical quantities as input values.

The actuator 34 operates on the basis of the output information output from the control device 20. The state of the plant facility 30 fluctuates according to the operation. The actuator 34 is, for example, a pump, a compressor, a valve, a motor, a motor driving device, or the like. Generally, as an output value indicated by the output information increases, the amount of operation of the actuator 34 increases. For example, the amount of operation of the actuator 34 is proportional to the output value. Accordingly, one control loop is formed by the sensor 32-1, the plant controller 22, and the actuator 34.

Although the number of control loops is one in the example shown in FIG. 1, the number of control loops may be two or more. If the number of control loops is two or more, processes related to the individual control loops may be executed in parallel.

(Monitoring Device)

Figure 2:
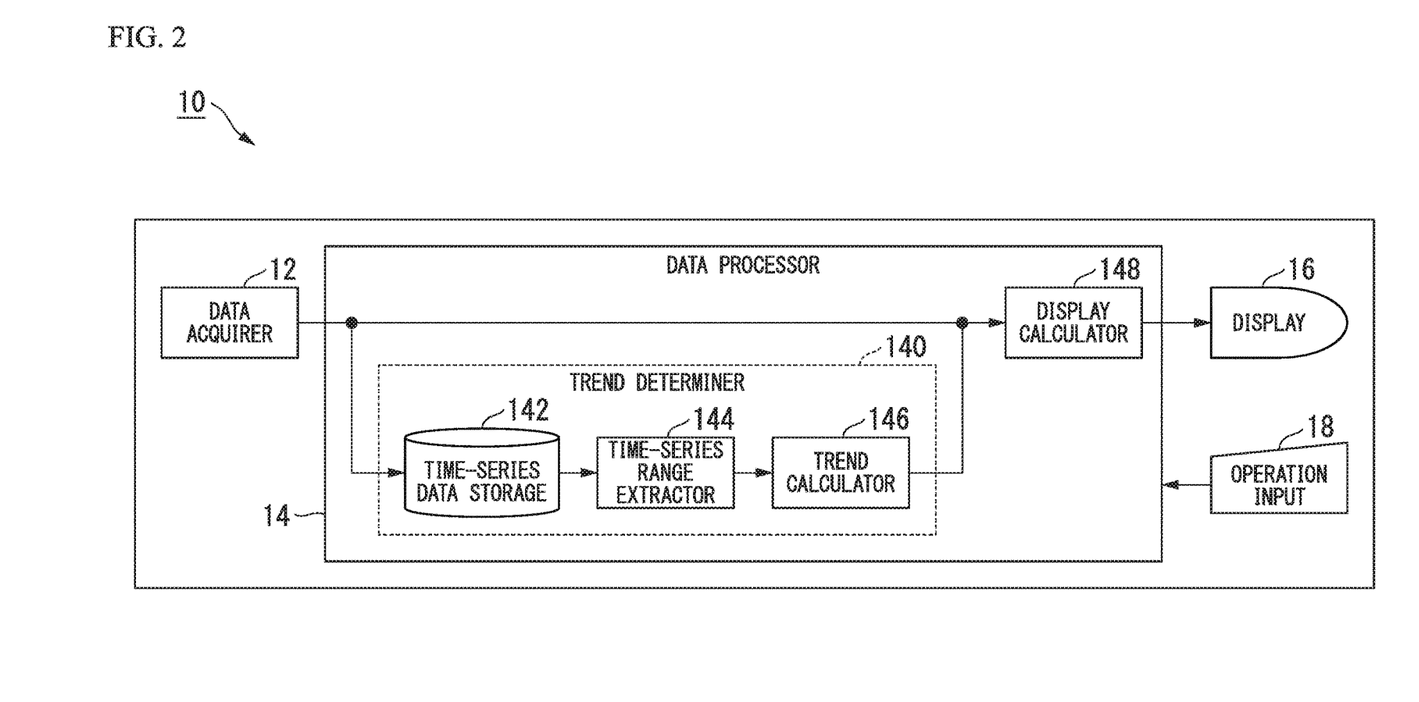
FIG. 2 is a block diagram showing a configuration example of a monitoring device according to the present embodiment.

Hereinafter, a configuration example of the monitoring device 10 according to the present embodiment will be described. FIG. 2 is a block diagram showing a configuration example of the monitoring device 10 according to the present embodiment.

The monitoring device 10 includes, for example, a data acquirer 12, a data processor 14, a display 16, and an operation input 18.

The data acquirer 12 receives observation data indicating observed values at points in time from the control device 20. The data acquirer 12 outputs the received observation data to the data processor 14. The data acquirer 12 is, for example, a communication interface, and is connected to the network NW in a wired or wireless mode. A means through which the data acquirer 12 acquires the observation data may not necessarily be the network NW.

The data processor 14 includes, for example, a trend determiner 140 and a display calculator 148 (display controller). The trend determiner 140 includes, for example, a time-series data storage 142, a time-series range extractor 144 (extractor), and a trend calculator 146 (first calculator).

The time-series data storage 142 stores the observation data input from the data acquirer 12. In the time-series data storage 142, the observation data is accumulated in the order of a time at which the observed values were acquired. The accumulated observation data is formed as time-series data indicating observed values at points in time.

The time-series range extractor 144 acquires time-series data indicating observed values at points in time within a predetermined data acquisition period up to a present point in time from the time-series data storage 142. It is only necessary for the data acquisition period to be a period including an analysis range from a reference point in time to the present point in time. The reference point in time is a point in time which is a predetermined time earlier than the present point in time. The present point in time is not necessarily limited to a time of this point in time (a present time), and may be the latest time at which an observed value was acquired. If the trend calculator 146 calculates the moving average value at the reference point in time, a length of the data acquisition period may be at least twice the length of the analysis range. The time-series range extractor 144 outputs the acquired time-series data to the trend calculator 146.

Time-series data from the time-series range extractor 144 is input to the trend calculator 146. The trend calculator 146 calculates a gradient of a linear function indicating a trend of change in the observed value at each point in time in the analysis range by using the time-series data so that an objective function is minimized. The objective function is a weighted sum of squares of values of differences between function values of the linear function and observed values at points in time. It is only necessary for a weighting coefficient at each point in time to be a numerical value that increases as an elapsed time from the reference point in time to a corresponding point in time increases.

The trend calculator 146 may calculate a centered moving average value having a reference point in time as a center time by using the time-series data. The centered moving average value is a simple average value of function values at points in time within the moving average section. The moving average section is a section from a point in time, which is an analysis range earlier than the reference point in time, to the present point in time. Hereinafter, a length of the moving average section is referred to as a window size. The centered moving average value is simply referred to as moving average value. The trend calculator 146 may calculate a slice of the linear function so that the function value at the reference point in time is equal to the centered moving average value. The trend calculator 146 can calculate a function value at each point in time within the analysis range on the basis of the calculated intercept and gradient. The trend calculator 146 outputs trend data indicating the calculated function value at each point in time to the display calculator 148. The trend calculator 146 may further include a moving average value in the trend data.

Observation data from the data acquirer 12 is input to the display calculator 148 and trend data is input from the trend calculator 146. The display calculator 148 generates graph data indicating observed values and function values at points in time within at least the analysis range. If the moving average value is included in the trend data, the display calculator 148 may generate graph data further indicating the observed values at the points in time and the moving average value up to the reference point in time. When the graph data is generated, the display calculator 148 converts each numerical value and a time at each point in time into coordinate values in a vertical direction and a horizontal direction, respectively. Between the observed value, the function value, and the moving average value, symbols or figures (for example, a color, a shape, a type of line, or the like) indicating these values may be different. The display calculator 148 outputs the generated graph data to the display 16.

The data processor 14 may control display of an observed value on the basis of information indicated by an operation signal input from the operation input 18. For example, the data processor 14 may update an analysis range set in the trend calculator 146 to a period indicated by the operation signal. If a plurality of types of observation data are input to the data processor 14, the data processor 14 may update a processing target type of observation data to a type of observation data indicated by the operation signal. In this case, observed values, function values, and the like related to the indicated type of observation data are displayed on the display 16. In the example shown in FIG. 1, input data from the sensor 32-1, input data from the sensor 32-2, deviation data indicating a deviation from the plant controller 22, and the like can be objects to be processed as types of observation data. The data processor 14 may be configured to execute a scheme in which a plurality of window sizes are set, the above-described process is performed in parallel with respect to different window sizes, and trend values suitable for an expected window size, that is, a gradient and a function value of a linear function, are calculated.

The data processor 14 may perform a process related to the operation of the control device 20 on the basis of information indicated by the operation signal input from the operation input 18. For example, the data processor 14 specifies a target value indicated by the operation signal as a control target value. The data processor 14 may specify a parameter for the controlled system to get the target value. The data processor 14 transmits target information indicating a specified target value or parameter to the control device 20.

The display 16 displays observed values and function values at points in time indicated by the graph data input from the data processor 14. The display 16 includes, for example, a liquid crystal display (LCD) and an organic electro luminescence display (OELD).

The operation input 18 receives an operation of the user and generates an operation signal corresponding to the received operation. The operation input 18 outputs the generated operation signal to the data processor 14. For example, the operation input 18 may include a general-purpose member such as a mouse, a keyboard, or a touch sensor, or may include a dedicated member such as a button, a lever, or a knob.

(Calculation of Trend of Change)

Figure 3:
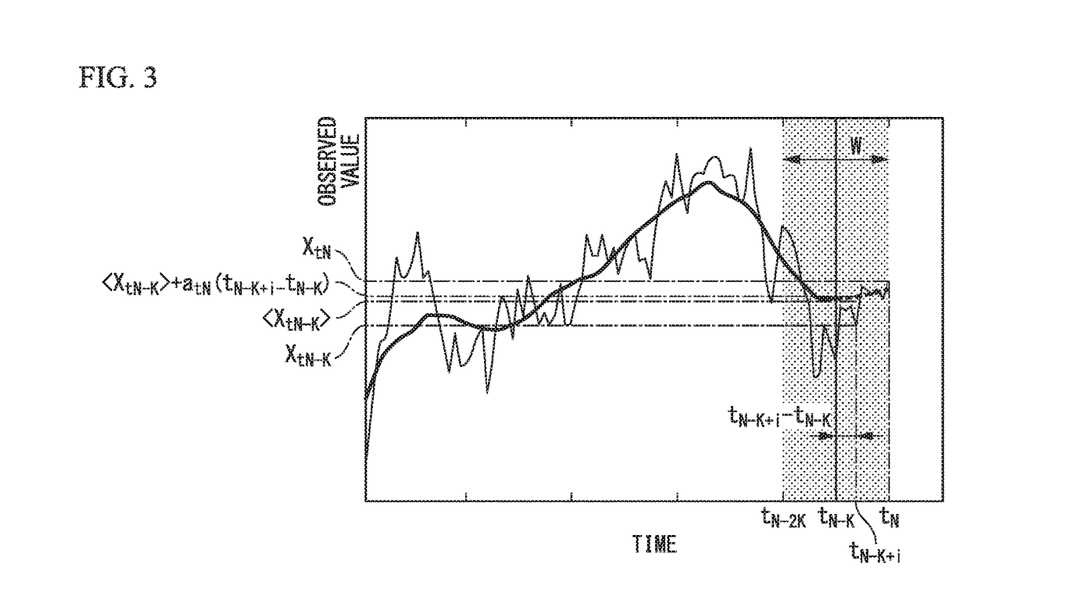
FIG. 3 is an explanatory diagram of a method of calculating a trend of change in time-series data according to the present embodiment.

Hereinafter, calculation of a trend of change in time-series data will be described with reference to FIG. 3. FIG. 3 is an explanatory diagram of a method of calculating the trend of change in the time-series data according to the present embodiment. An observed value at a time $t_i$ constituting the time-series data input to the trend calculator 146 is represented by $x_{ti}$. i is an integer indicating an order of each point in time. A time $t_N$ indicates a time at a present point in time. In FIG. 3, a thin solid line indicates a time series of observed values at points in time up to the present point in time. A window size W is preset in the trend calculator 146. The window size W corresponds to the number of observed values 2K+1 within the moving average section. K is an integer of 1 or more indicating the number of observed values within the analysis range.

The trend calculator 146 calculates a moving average value $<x_{tN-K}>$ at a reference point in time $t_{N-K}$ that is a time which is K points earlier than a present point in time $t_N$. According to the given time-series data, the moving average value up to the reference point in time $t_{N-K}$ can be calculated. In FIG. 3, a thick solid line indicates a moving average value at each point in time up to the reference point in time $t_{N-K}$. However, observed values at times after the present point in time $t_N$ are required to calculate a moving average value at a time after the reference point in time $t_{N-K}$. Thus, it is not possible to calculate the moving average value at times between the reference point in time $t_{N-K}$ and the present point in time $t_N$. Therefore, the trend calculator 146 calculates a function value of a linear function indicating the trend of change in the observed value at each time after the reference point in time $t_{N-K}$. The trend calculator 146 adopts a moving average value $<x_{tN-K}>$ at a reference point in time $t_{N-K}$ as the function value at reference point in time $t_{N-K}$.

The trend calculator 146 calculates a gradient $a_{t_N}$ of a linear function $\langle x_{t_{N-K}}\rangle + a_{t_N}(t_{N-K+i} - t_{N-K})$ at each point in time $t_{N-K+i}$ by using moment regression. The moment regression is, for example, a method of minimizing an objective function J shown in Equation (1) to calculate the gradient $a_{t_N}$.

$$J = \sum_{i=1}^{K} \{(x_{t_{N-K+i}} - \langle x_{t_{N-K}}\rangle) - a_{t_N}(t_{N-K+i} - t_{N-K})\}^2 (t_{N-K+i} - t_{N-K}) \quad (1)$$

In Equation (1), $t_{N-K+i} - t_{N-K}$ represents an elapsed time from the reference point in time $t_{N-K}$ at a time $t_{N-K+i}$. A value $\langle x_{t_{N-K}}\rangle + a_{t_N}(t_{N-K+i} - t_{N-K})$ to be subtracted within { . . . } corresponds to a function value at a time $t_{N-K+i}$ of the linear function. Accordingly, Equation (1) shows that the objective function can be obtained by taking a sum of multiplication values obtained by multiplying a square of a difference value obtained by subtracting the function value of the linear function from the observed value $x_{t_{N-K+i}}$ at a time $t_{N-K+i}$ by the elapsed time $t_{N-K+i} - t_{N-K}$ within the analysis range. In Equation (1), a part represented by { . . . } is a term used in a normal least-squares method.

The trend calculator 146 uses a relationship given by Equation (2) when the gradient $a_{t_N}$ for minimizing the objective function J shown in Equation (1) is calculated.

$$a_{t_N} = \frac{\sum_{i=1}^{K}(x_{t_{N-K+i}} - \langle x_{t_{N-K}}\rangle)(t_{N-K+i} - t_{N-K})^2}{\sum_{i=1}^{K}(t_{N-K+i} - t_{N-K})^3} \quad (2)$$

Equation (2) is derived from a condition that a derivative obtained by differentiating the objective function J with the gradient $a_{t_N}$ becomes 0. In FIG. 3, a thick broken line indicates the function value of the linear function at points in time from the reference point in time $t_{N-K}$ to the present point in time $t_N$.

In the above-described example, when the objective function J is calculated, the square of the difference value is multiplied by the elapsed time $t_{N-K+i} - t_{N-K}$. Thus, because the contribution of a value of a difference from the function value to the objective function J increases when a new observed value is given, a variation with time of the observed value closer to the present point in time is regarded as important. Accordingly, a function value indicating a trend of change close to the user's intuition is estimated without delaying a phase of the function value with respect to a phase of the observed value.

If the analysis range up to the present point in time $t_N$ is set with a period in the trend calculator 146, even if there is a defective point at which it is not possible to acquire an observed value in a part of the analysis range, the calculation of the gradient $a_{t_N}$ using Equation (2) is possible. Thus, in a situation in which measured values from the sensors 32-1 and 32-2 of FIG. 1 cannot be measured temporarily, it is possible to calculate a stable function value even when a loss is caused, such as, for example, when all or some functions of the input and output 24 temporarily malfunction, when all or some functions are temporarily stopped, or when there is transmission loss of the network NW.

Although the present invention is applicable even when an interval between points in time is an indefinite interval, Equation (1) is modified as shown in Equation (3) if the interval between the points in time is a constant interval d.

$$J = \sum_{i=1}^{K} \{(x_{t_{N-K+i}} - \langle x_{t_{N-K}}\rangle) - a_{t_N} id\}^2 id \quad (3)$$

In Equation (3), a time $t_i$ is $t_1 + (i-1)d$.

Then, on condition that a derivative obtained by differentiating the objective function J shown in Equation (3) with the gradient $a_{t_N}$ becomes 0, a relationship shown in Equation (4) is obtained.

$$a_{t_N} = \frac{\sum_{i=1}^{K}(x_{t_{N-K+i}} - \langle x_{t_{N-K}}\rangle)(id)^2}{\sum_{i=1}^{K}(id)^3} \quad (4)$$

A denominator of Equation (4) is a constant. A value of this constant is $K(K+1)(2K+1) \cdot d^3/6$. It is only necessary to use a preset constant when the trend calculator 146 calculates the gradient $a_{t_N}$ by using the relationship shown in Equation (4). By omitting a process of sequentially calculating constants, an amount of calculation is further reduced. Thus, it becomes easy to mount on a device (for example, an embedded device) having a relatively small operation resource or the like.

Although an example in which a weighting coefficient $w_i$ to be multiplied by a square of a difference of a function value from an observed value at each point in time $t_{N-K+i}$ is proportional to the elapsed time $t_{N-K+i} - t_{N-K}$ from the reference point in time $t_{N-K}$ in the objective function J shown in Equation (3) has been described, the present invention is not limited thereto. The weighting factor $w_i$ may be generalized to a positive value monotonically increasing with respect to an increase in the elapsed time $t_{N-K+i} - t_{N-K}$. The weighting coefficient $w_i$ may be preset in the trend calculator 146 as an element value of a K-dimensional weighting coefficient vector. In this case, the objective function J shown in Equation (3) is generalized as shown in Equation (5).

$$J = \sum_{i=1}^{K} \{(x_{t_{N-K+i}} - \langle x_{t_{N-K}}\rangle) - a_{t_N} id\}^2 w_i \quad (5)$$

As a condition that a derivative obtained by differentiating the objective function J shown in Equation (5) with the gradient $a_{t_N}$ becomes 0, a relationship shown in Equation (6) is obtained. The trend calculator 146 may calculate the gradient $a_{t_N}$ by using Equation (6).

$$a_{t_N} = \frac{\sum_{i=1}^{K}(x_{t_{N-K+i}} - \langle x_{t_{N-K}}\rangle) id \cdot w_i}{\sum_{i=1}^{K}(id)^2 w_i} \quad (6)$$

When the interval between the points in time is an indefinite interval, the trend calculator 146 may calculate the gradient $a_{t_N}$ by using Equation (7).

$$a_{t_N} = \frac{\sum_{i=1}^{K}(x_{t_{N-K+i}} - \langle x_{t_{N-K}}\rangle)(t_{N-K+i} - t_{N-K}) w_i}{\sum_{i=1}^{K}(t_{N-K+i} - t_{N-K})^2 w_i} \quad (7)$$

Equation (7) corresponds to an equation obtained by replacing the elapsed time $t_{N-K+i} - t_{N-K}$ from the reference point in time $t_{N-K}$ with the weighting coefficient $w_i$ in Equation (2).

The trend calculator 146 may calculate the gradient $a_{t_N}$ by using a function w(t) that depends on an elapsed time t from the reference point in time $t_{N-K}$ as the weighting coefficient $w_i$, as shown in Equation (8).

$$a_{t_N} = \frac{\sum_{i=1}^{K}(x_{t_{N-K+i}} - \langle x_{t_{N-K}}\rangle)(t_{N-K-i} - t_{N-K})w(t_{N-K+i} - t_{N-K})}{\sum_{i=1}^{K}(t_{N-K+i} - t_{N-K})^2 w(t_{N-K+i} - t_{N-K})} \quad (8)$$

(Trend Determination Process)

Figure 4:
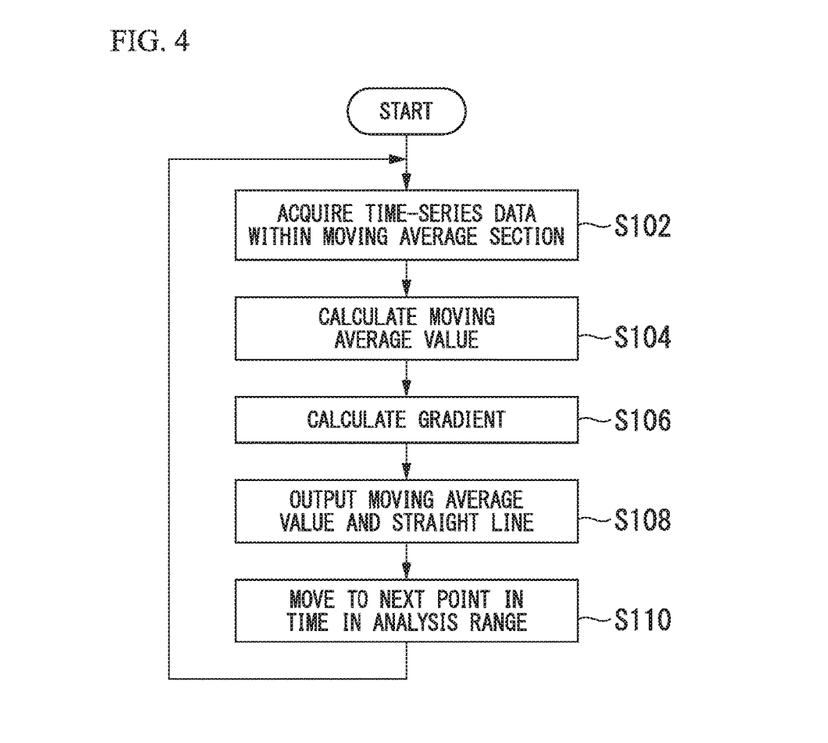
FIG. 4 is a flowchart showing an example of a trend determination process according to the present embodiment.

Hereinafter, an example of a trend determination process according to the present embodiment will be described. FIG. 4 is a flowchart showing an example of the trend determination process according to the present embodiment.

(Step S102) The time-series range extractor 144 acquires time-series data indicating observed values $x_{t_{N-2K}}, \ldots, x_{t_N}$ at points in time within a moving average section up to a present point in time $t_N$ from the time-series data storage 142. Thereafter, the process proceeds to step S104.

(Step S104) The trend calculator 146 calculates a moving average value $\langle x_{t_{N-K}}\rangle$ having the reference point in time $t_{N-K}$, which is a predetermined time earlier than the present point in time, as a center time by using the acquired time-series data.

Thereafter, the process proceeds to the processing of step S106.

(Step S106) The trend calculator 146 calculates a gradient $a_{t_{N-K}}$ of a linear function for giving a function value at each point in time within an analysis range up to a present point in time so as to minimize an objective function. Any of Equations (2), (4), (6), (7), and (8) may be used when the gradient $a_{t_{N-K}}$ is calculated. Thereafter, the process proceeds to the processing of step S108.

(Step S108) The display calculator 148 sets a coordinate point indicating the calculated moving average value $\langle x_{t_{N-K}}\rangle$ as a starting point and outputs graph data indicating a straight line representing function values of a linear function determined by the moving average value $\langle x_{t_{N-K}}\rangle$ and the gradient $a_{t_{N-K}}$ to the display 16. The graph data may further include a coordinate value indicating an observed value $x_{t_i}$ at each point in time $t_i$ up to the present point in time $t_N$. The output thereof becomes an output at the present point in time $t_N$. Thereafter, the process proceeds to the processing of step S110.

(Step S110) The data processor 14 sets the present point in time $t_N$, which is the latest point in time in the analysis range, as the next point in time $t_{N+1}$. Thereafter, the process returns to the processing of step S102.

(Display Example)

Figure 5:
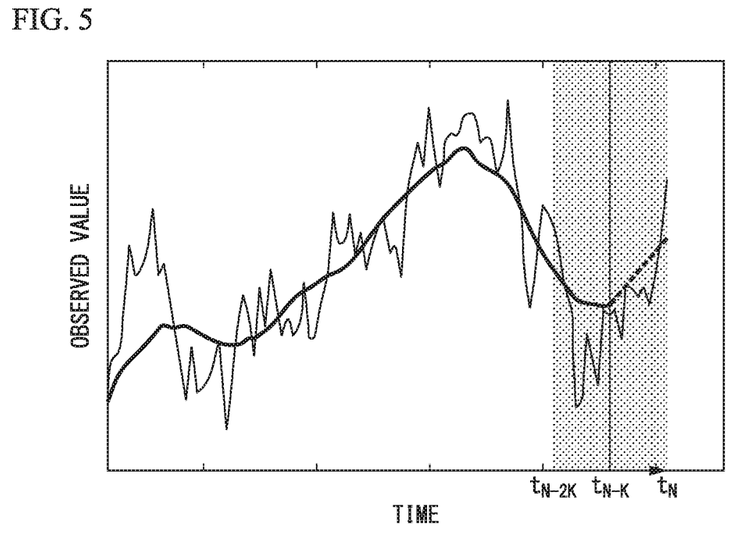
FIG. 5 is a diagram showing one display example of graph data displayed by a display according to the present embodiment.
Figure 6:
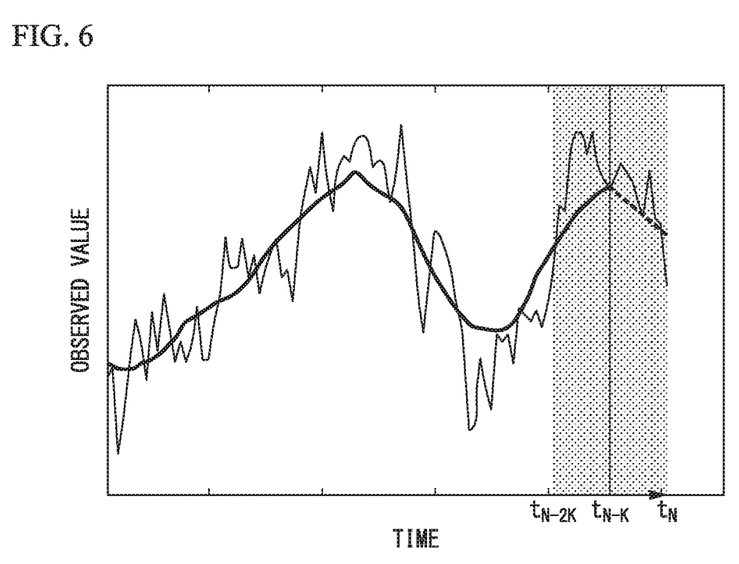
FIG. 6 is a diagram showing another display example of graph data displayed by the display according to the embodiment.

Hereinafter, a display example of graph data displayed by the display 16 according to the present embodiment will be described.

FIGS. 5 and 6 are diagrams showing display examples of graph data displayed by the display 16. In FIGS. 5 and 6, a thick solid line, a thin solid line, and a thick broken line indicate a moving average value up to the reference point in time $t_{N-K}$, an observed value up to the present point in time $t_N$, and a function value of the linear function in the analysis range from $t_{N-K}$ to $t_N$, respectively. These function values are values calculated on the basis of the gradient $a_N$ calculated using Equation (4) and the moving average value $\langle x_{t_{N-K}}\rangle$ at the reference point in time $t_{N-K}$. A length K of the calculation analysis range is 10 points. In both FIG. 5 and FIG. 6, a straight line indicating the function value within the analysis range is shown without any delay of the phase with respect to the observed value while matching the moving average value at the reference point in time $t_{N-K}$. In the example shown in FIG. 5, the straight line indicating the function value shows an increasing trend with the passage of time of the observed value at each point in time in the vicinity of the present point in time $t_N$. On the other hand, the moving average value at the reference point in time $t_{N-K}$ shows a decreasing trend. In the example shown in FIG. 6, the straight line indicating the function value shows a decreasing trend of the observed value at each point in time in the vicinity of the present point in time $t_N$. On the other hand, the moving average value at the reference point in time $t_{N-K}$ shows an increasing trend. In this manner, according to the present embodiment, the trend of change in the observed value at the present point in time is shown to be more suitable for human intuition than that of the moving average value.

(Plant Controller)

Hereinafter, the configuration of the plant controller 22 of the control device 20 according to the present embodiment will be described.

Figure 7:
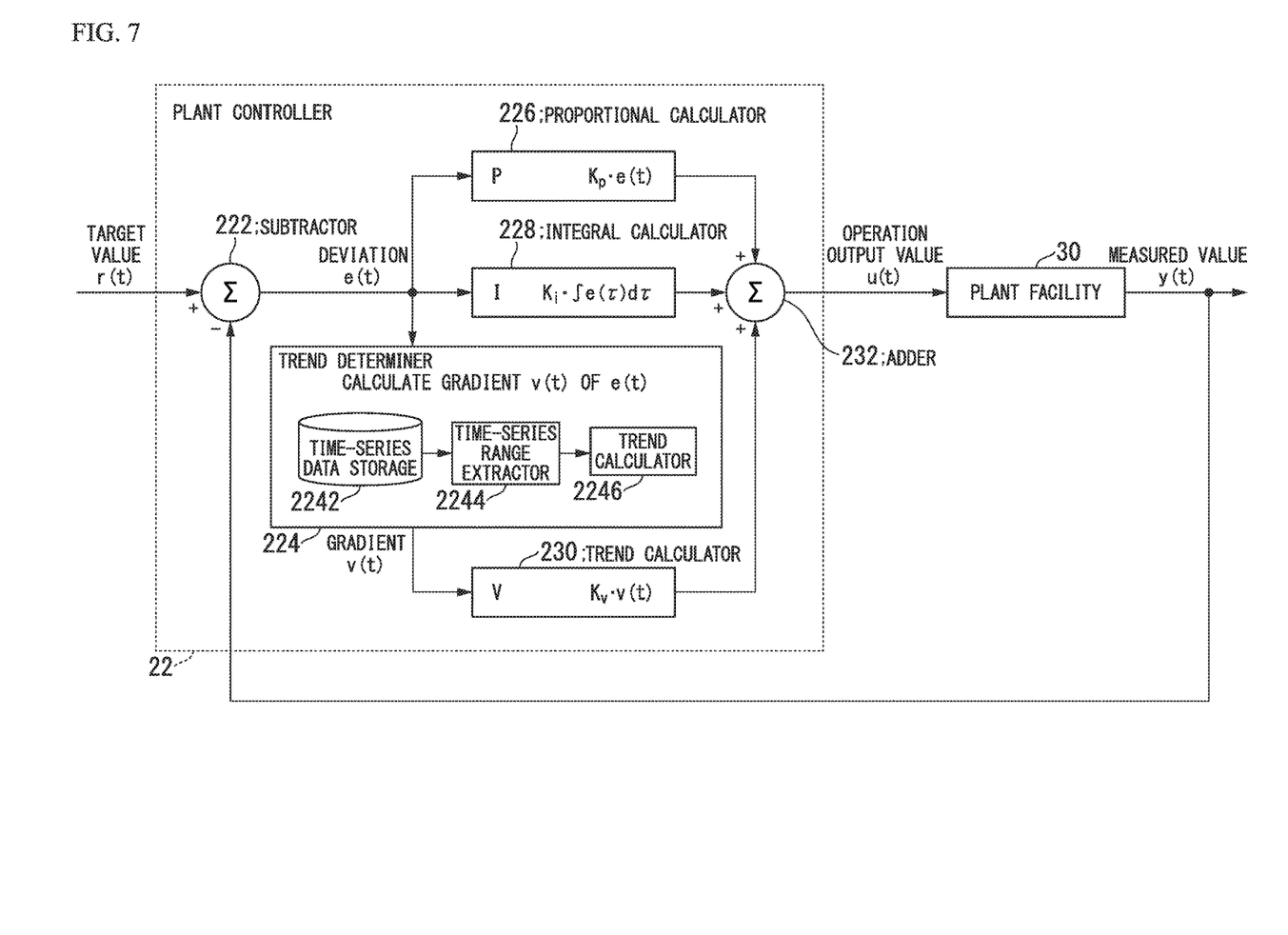
FIG. 7 is a block diagram showing a configuration of a plant controller 22 according to the present embodiment.

FIG. 7 is a block diagram showing a configuration example of the plant controller 22 according to the present embodiment.

The plant controller 22 includes, for example, a subtractor 222 (second calculator), a trend determiner 224, a proportional calculator 226, an integral calculator 228, a trend calculator 230 (third calculator), and an adder 232.

The trend determiner 224 includes, for example, a time-series data storage 2242, a time-series range extractor 2244, and a trend calculator 2246. Configurations of the time-series data storage 2242, the time-series range extractor 2244, and the trend calculator 2246 are similar to those of the time-series data storage 142, the time-series range extractor 144, and the trend calculator 146 (FIG. 2).

The time-series data storage 2242 stores deviation information indicating a deviation at each point in time input from the subtractor 222 as observation data indicating an observed value at each point in time. In the time-series data storage 2242, the deviation information is accumulated in the order of each point in time at which the deviation was calculated. The accumulated deviation information is formed as time-series data indicating the deviation at each point in time.

Hereinafter, processing performed by each unit will be described.

The subtractor 222 subtracts an input value (measured value) y(t) of a point in time indicated by the input information from the plant facility 30 from a target value r(t) at a present point in time t indicated by a target value information, and calculates a deviation e(t) at the point in time. The calculated deviation e(t) is input to the trend determiner 224, the proportional calculator 226, and the integral calculator 228.

The trend determiner 224 calculates a gradient v(t) at the present point in time t from the deviation e(t) within the analysis range up to the present time in point t. For example, the trend determiner 224 substitutes the deviation e(t) as the observed value $x_{t_N}$ shown in one of Equations (2), (4), (6), (7) and (8) to calculate the gradient v(t) as the gradient $a_{t_N}$. The calculated gradient v(t) is input to the trend calculator 230.

The proportional calculator 226 calculates $K_p \cdot e(t)$ as a proportional term P by multiplying the deviation e(t) by a predetermined proportional gain $K_p$. The calculated proportional term P is input to the adder 232.

The integral calculator 228 calculates $K_I \cdot \int e(\tau)d\tau$ as an integral term I by multiplying an integral value $\int e(\tau)d\tau$ up to a time t by a predetermined integral gain $K_1$. A start time of the integral interval is, for example, an operation start time of the control device 20. The calculated integral term I is input to the adder 232.

The trend calculator 230 calculates $K_v \cdot v(t)$ as a gradient term V by multiplying the gradient v(t) at the present point in time t by a predetermined gradient gain $K_v$. The calculated gradient term V is input to the adder 232.

The adder 232 calculates a sum of the proportional term P, the integral term I, and the gradient term V as an output value (operation output value) u(t). Output information indicating the calculated output value u(t) is output to the plant facility 30.

In a method of calculating the output value in the plant controller 22 shown in FIG. 7, the gradient term V calculated from the gradient v(t) indicating variation with time of a control state of the plant facility 30 is used instead of a differential term D in PID control. In the calculation of the gradient v(t), the deviation e(t) closer to the present point in time t than in the past is regarded to be important as the deviation e(t) indicating the control state of the plant facility 30. Thus, the influence of disturbance is less than in the differential term D which fluctuates considerably with time due to noise or other disturbance, and more stable control is enabled by using the gradient term V.

The plant controller 22 may further include a differential calculator and a selector. The differential calculator is provided in parallel to the trend calculator 230, and calculates the differential term D from the deviation e(t) from the subtractor 222. The selector selects either the differential term D from the differential calculator or the gradient term V from the trend calculator 230, and outputs the selected term to the adder 232. Thereby, either the differential term D or the gradient term V is used in the calculation of the output value u(t).

The control method of the plant controller 22 may be any one of PIV, PV, IV, and V. As described above, PIV is a method of setting a sum of the proportional term P, the integral term I, and the gradient term V as an output value. PV is a method of setting a sum of the proportional term P and the gradient term V as an output value. IV is a method of setting a sum of the integral term I and the gradient term V as an output value. V is a method of setting the gradient term V as an output value.

As described above, the control device 20 serving as the data processing device according to the present embodiment includes the time-series range extractor 2244 configured to extract time-series data indicating observed values at points in time in the analysis range from a reference point in time to a present point in time in the plant controller 22. In the example shown in FIG. 7, the deviation e(t) between the target value r(t) serving as a target of the measured value and the measured value y(t) from the plant facility 30 is used as an observed value. The data processing device further includes the trend calculator 2246 configured to calculate a gradient of a linear function indicating a trend of change in an observed value at each point in time in the analysis range so that the objective function is minimized. As the objective function, a sum of multiplication values at points in time within the analysis range is used. A numerical value obtained by multiplying a square of a difference between the function value of the linear function and the observed value by a weighting coefficient is used as the multiplication value and a numerical value that increases as an elapsed time from the reference point in time to each point in time increases is used as the weighting coefficient.

According to this configuration, because the gradient of the linear function is calculated by regarding the observed value close to the present point in time as important, the phase of the function value of the linear function indicating the trend of change in the observed value is not delayed with respect to the observed value at the present point in time. Therefore, a random variation with time of observed values is reduced or eliminated and a trend of change in an observed value suitable for human intuition is indicated as a quantified value. Accordingly, the observer can easily determine the trend of change in a state of the monitoring object. Consequently, the burden for monitoring or operation thereof is reduced.

In the method of calculating the output value in the plant controller 22 described above, the gradient term V calculated from the gradient v(t) indicating the variation with time of the control state of the plant facility 30 is used instead of the differential term D in the PID control. In the calculation of the gradient v(t), a deviation e(t) closer to the present point in time t than in the past is regarded to be important as a deviation e(t) indicating the control state of the plant facility 30. Thus, the influence of disturbance is less than in the differential term D which fluctuates considerably with time due to noise or other disturbances, and more stable control is enabled using the gradient term V.

The weighting coefficient to be multiplied by a square of a difference between a function value of a linear function and an observed value is set as a numerical value proportional to an elapsed time from a reference point in time.

Because an operation is performed only with the latest trend analysis range, an increase in a hardware scale and an amount of operation is minimized and economical introduction becomes possible.

The monitoring device 10 includes the display calculator 148 configured to generate graph data indicating a linear function that gives a function value at each point in time and output the graph data to the display 16.

According to this configuration, a variation with time of a function value of a linear function indicating a trend of change in an observed value is displayed. Thus, the user can ascertain the trend of change in the observed value suitable for his/her intuition by viewing the variation with time of the function value to be displayed.

The control device 20 includes the subtractor 222 configured to calculate a deviation between a measured value from a control target, for example, the plant facility 30 shown in FIG. 7, and a target value as observed values and the trend calculator 230 and the adder 232 configured to calculate an output value to be output to the plant facility 30 on the basis of at least a gradient at a present point in time.

According to this configuration, an output value is calculated using a trend of change in an observed value obtained by reducing or eliminating minute random components without delay in the phase. Thus, it is possible to perform more stable control than when a derivative of an observed value with respect to time is used without delay.

(Modified Example)

Although embodiments of the present invention have been described with reference to the drawings, specific configurations are not limited to those described above and various design changes and the like can be made without departing from the scope of the present invention.

Although the number of monitoring devices 10 and the number of control devices 20 are one in the example shown in FIG. 1, the present invention is not limited thereto. The number of monitoring devices 10 and the number of control devices 20 may be two or more. The operation of the monitoring device 10 and the operation of the control device 20 are not necessarily synchronized and may be independent.

Although an example in which the monitoring device 10 includes the display 16 and the operation input 18 is taken in the embodiment shown in FIG. 2, the present invention is not limited thereto. One or both of the display 16 and the operation input 18 may not be included in the monitoring device 10 as long as it is possible to transmit and receive data to and from the monitoring device 10.

The control device 20 may be configured integrally with one or both of the sensor 32-1 and the actuator 34. In this case, the control device 20 may be implemented as a so-called Internet of things (IoT) (mono Internet) device such as a sensor module or an actuator module. The trend determiners 140 and 224 may be configured to be anywhere, regardless of an installation location, a device arrangement, or the like.

Although the monitoring device 10 and the control device 20 in the data processing system 1 are mainly exemplified in the embodiment of the above-described data processing device, the present invention is not limited thereto. Time-series data to be processed includes components randomly varying with time and is useful for any field of application as long as time-series data including many observed values is provided. For example, the time-series data can be applied to a heart rate, a blood pressure, etc. as observed values in the medical field. As an observed value in the field of finance and commerce, the time-series data is applicable to prices of securities such as stock prices, exchange rates such as foreign exchange, commodity prices, and the like. In security and monitoring of device operation, the time-series data is applicable to a volume of an environmental sound or an operation sound, a fundamental frequency, or the like. The control target is not necessarily limited to the plant facility 30, and may be a process system, an operation of each device, or the like.

What is claimed is:

1. A data processing device comprising:
at least one memory storing instructions, and
at least one processor configured to execute the instructions to:
extract time-series data indicating observed values at points in time in an analysis range from a first point in time to a second point in time;
calculate a gradient of a linear function indicating a trend of change in the observed values in the analysis range to minimize an objective function, the objective function indicating a sum of multiplication values at the points in time within the analysis range, each of the multiplication values being a numerical value obtained by multiplying a square of a difference between a function value of the linear function and each of the observed values at each of the points in time within the analysis range by a weighting coefficient, the weighting coefficient being a numerical value that increases as an elapsed time from the first point in time to each point in time increases;
calculate a deviation of an input value input from a control target and a target value of the input value as the observed values; and
calculate an output value to be output to the control target on the basis of at least the gradient at a present point in time.

2. The data processing device according to claim 1, wherein
the weighting coefficient is a numerical value that is proportional to the elapsed time.

3. The data processing device according to claim 1, wherein
the at least one processor is configured to execute the instructions to:
calculate a moving average value at the first point in time on the basis of each of the observed values at each point in time; and
calculate the function value on the basis of the gradient and the moving average value.

4. The data processing device according to claim 1, wherein the at least one processor is configured to execute the instructions to:
generate graph data indicating the linear function and output the graph data to a display.

5. The data processing device according to claim 4, wherein
the at least one processor is configured to execute the instructions to:
output the calculated function value at each point in time, and
generate the graph data indicating a variation with time of the function value and each of the observed values at each point in time.

6. The data processing device according to claim 1, wherein
the second point in time is a present point in time,
the first point in time is a reference point in time which is a predetermined time earlier than the present point in time,
the at least one processor is configured to execute the instructions to:
calculate a centered moving average value having the reference point in time as a center time; and
calculate the function value on the basis of the gradient and the centered moving average value.

7. The data processing device according to claim 6, wherein
the at least one processor is configured to execute the instructions to:
calculate a slice of the linear function under a condition that the function value at the reference point in time is equal to the centered moving average value.

8. The data processing device according to claim 7, wherein
the at least one processor is configured to execute the instructions to:
calculate the function value on the basis of the gradient, the slice, and the centered moving average value.

9. The data processing device according to claim 1, wherein
the at least one processor is configured to execute the instructions to:
extract, as the time-series data, physical quantities indicating operation state of a plant facility.

10. A data processing method comprising:
extracting time-series data indicating observed values at points in time in an analysis range from a first point in time to a second point in time;
calculating a gradient of a linear function indicating a trend of change in the observed values in the analysis range to minimize an objective function, the objective function indicating a sum of multiplication values at the points in time within the analysis range, each of the multiplication values being a numerical value obtained by multiplying a square of a difference between a function value of the linear function and each of the observed values at each of the points in time within the analysis range by a weighting coefficient, the weighting coefficient being a numerical value that increases as an elapsed time from the first point in time to each point in time increases;

calculating a deviation of an input value input from a control target and a target value of the input value as the observed values; and calculating an output value to be output to the control target on the basis of at least the gradient at a present point in time.

11. The data processing method according to claim 10, wherein
the weighting coefficient is a numerical value that is proportional to the elapsed time.

12. The data processing method according to claim 10, further comprising:
calculating a moving average value at the first point in time on the basis of each of the observed values at each point in time; and
calculating the function value on the basis of the gradient and the moving average value.

13. The data processing method according to claim 10, further comprising:
generating graph data indicating the linear function and outputting the graph data to a display.

14. The data processing method according to claim 10, wherein
the second point in time is a present point in time,
the first point in time is a reference point in time which is a predetermined time earlier than the present point in time,
the first data processing method further comprises:
calculating a centered moving average value having the reference point in time as a center time; and
calculating the function value on the basis of the gradient and the centered moving average value.

15. The data processing method according to claim 14, further comprising:
calculating a slice of the linear function under a condition that the function value at the reference point in time is equal to the centered moving average value.

16. The data processing method according to claim 15, wherein
calculating the function value comprises calculating the function value on the basis of the gradient, the slice, and the centered moving average value.

17. The data processing method according to claim 10, wherein
extracting the time-series data comprises extracting, as the time-series data, physical quantities indicating operation state of a plant facility.

18. A non-transitory computer-readable storage medium storing a program, which when executed by a computer, causes the computer to:
extract time-series data indicating observed values at points in time in an analysis range from a first point in time to a second point in time;
calculate a gradient of a linear function indicating a trend of change in the observed values in the analysis range to minimize an objective function, the objective function indicating a sum of multiplication values at the points in time within the analysis range, each of the multiplication values being a numerical value obtained by multiplying a square of a difference between a function value of the linear function and each of the observed values at each of the points in time within the analysis range by a weighting coefficient, the weighting coefficient being a numerical value that increases as an elapsed time from the first point in time to each point in time increases;
calculate a deviation of an input value input from a control target and a target value of the input value as the observed values; and
calculate an output value to be output to the control target on the basis of at least the gradient at a present point in time.

* * * * *